(No Model.)

A. P. ORDWAY & A. F. RYDER.
OIL CAN EDUCT.

No. 257,748.                    Patented May 9, 1882.

Witnesses.
S. N. Piper.
E. A. Pratt

Inventors.
Aaron P. Ordway,
Arthur F. Ryder.
by R. H. Eddy, att'y

UNITED STATES PATENT OFFICE.

AARON P. ORDWAY AND ARTHUR F. RYDER, OF LAWRENCE, MASS.

OIL-CAN EDUCT.

SPECIFICATION forming part of Letters Patent No. 257,748, dated May 9, 1882.

Application filed January 9, 1882. (No model.)

*To all whom it may concern:*

Be it known that we, AARON P. ORDWAY and ARTHUR F. RYDER, of Lawrence, of the county of Essex and State of Massachusetts, have invented a new and useful Improvement in Oil-Can Educts; and we do hereby declare the same to be described in the following specification and represented in the accompanying drawings, of which—

Figure 1:
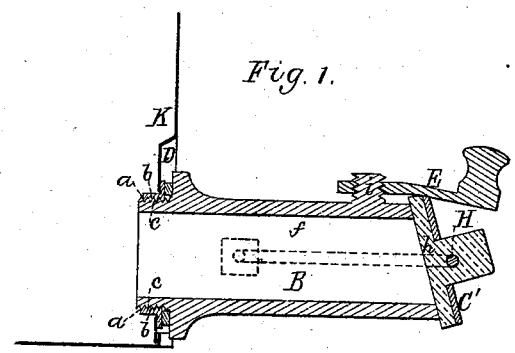
Figure 2:
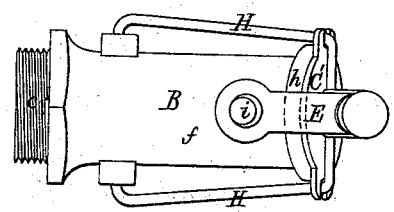
Figure 3:
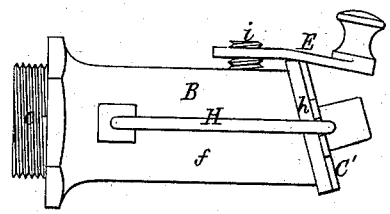

Figure 1 is a vertical and longitudinal section of our improved educt as applied to the lower portion of an oil-can. Fig. 2 is a top view, and Fig. 3 a side view, of the said educt.

The nature of our invention is defined in the claims hereinafter presented.

In Fig. 1 of the drawings the oil-can in part is shown at K as having in the lower part of it an arched recess, D, and a discharge-orifice, a, the latter being provided with a female screw, b, to receive and fit to the male screw c of the educt.

The educt B consists in part of a nozzle or tube, f, having at its inner end a screw, c, to fit the screw b.

The outer end of the nozzle or tube is inclined to the axis of the tube in manner as represented, such end being to operate with a gate, C', provided with an elastic packing, h. This gate is supported or carried by a yoke, H, which embraces the nozzle and is pivoted thereto.

There extends upward from the nozzle a screw, i, on which is screwed a crank, E. The gate being circular, the crank by being turned against its upper edge forces the gate downward and the packing firmly into contact with the inclined end of the nozzle, and serves while on the gate to retain it in place. By revolving the crank around on the screw the altitude of the crank may be varied relatively to the nozzle and gate. In this way the crank may be adjusted to obtain by it the necessary pressure on the gate to effect the proper closing of the nozzle by the gate or its packing.

On raising the gate on and relatively to the nozzle the latter may be opened so as to discharge oil or liquid from the can.

What we claim as our invention is as follows, viz:

1. The combination of the crank E with the can-nozzle f, having its outer end inclined as set forth, and with the gate C' and its supporting-yoke H, applied to the said nozzle, all being substantially as described.

2. The combination of the can-nozzle f, inclined at its outer end as set forth, the gate C', yoke H, crank E, and the supporting and adjusting screw i of said crank, all being arranged and applied and to operate substantially in manner as explained.

AARON P. ORDWAY.
ARTHUR F. RYDER.

Witnesses:
PETER W. LYALL,
NEWTON P. FRYE.